March 8, 1966  W. A. RAY  3,239,189
HEAT MOTOR OPERATED VALVES
Original Filed Oct. 19, 1961  4 Sheets-Sheet 1
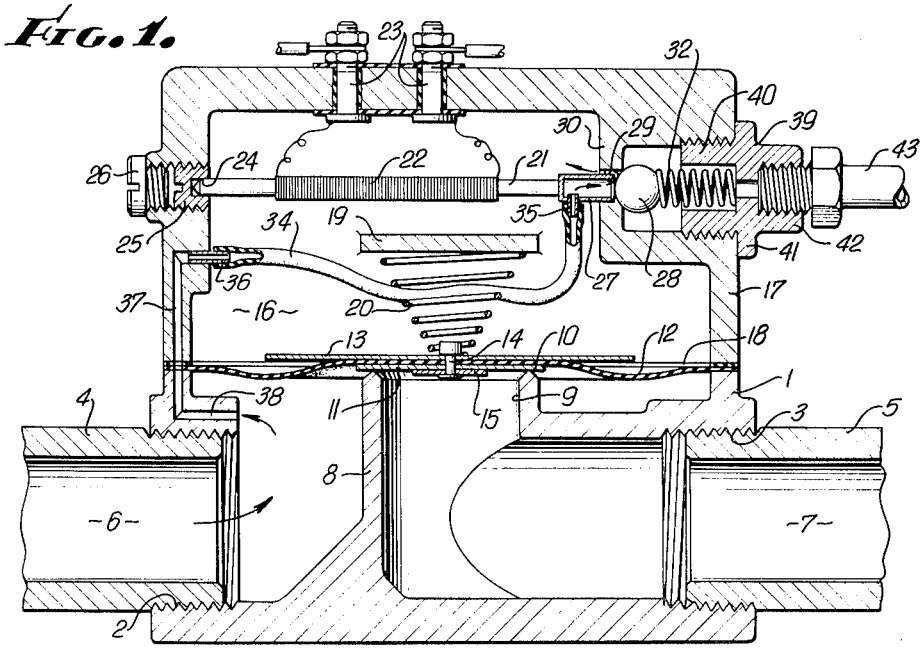
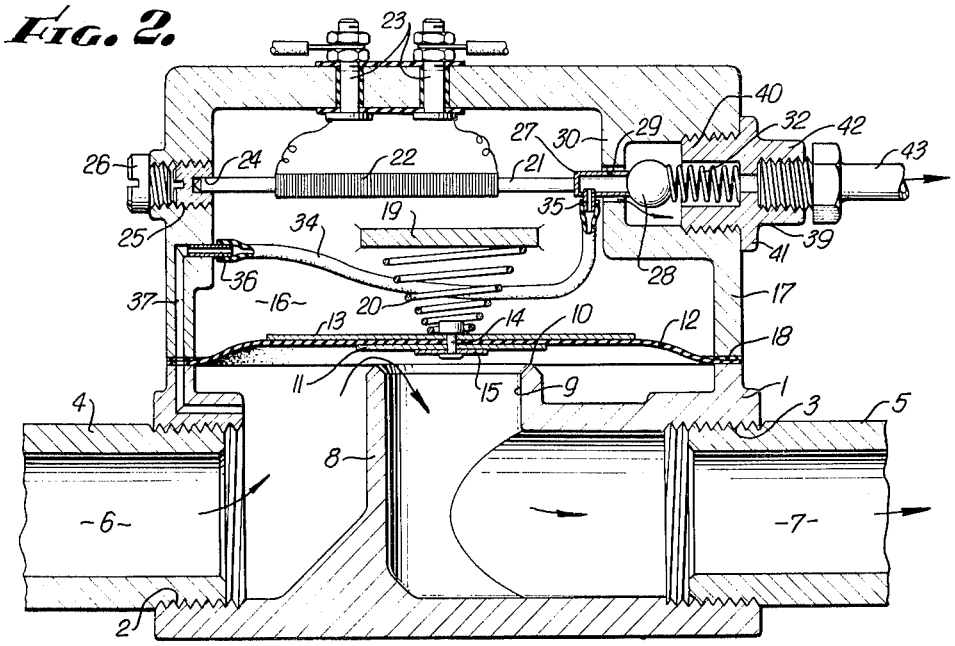
INVENTOR.
WILLIAM A. RAY
BY Flam and Flam
ATTORNEYS.

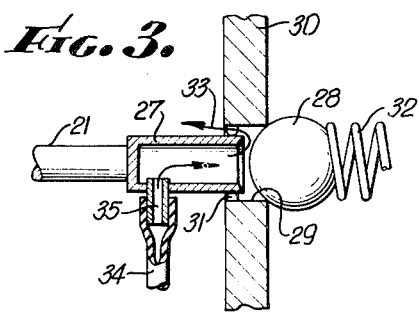
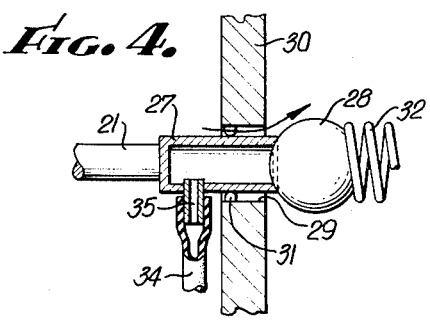
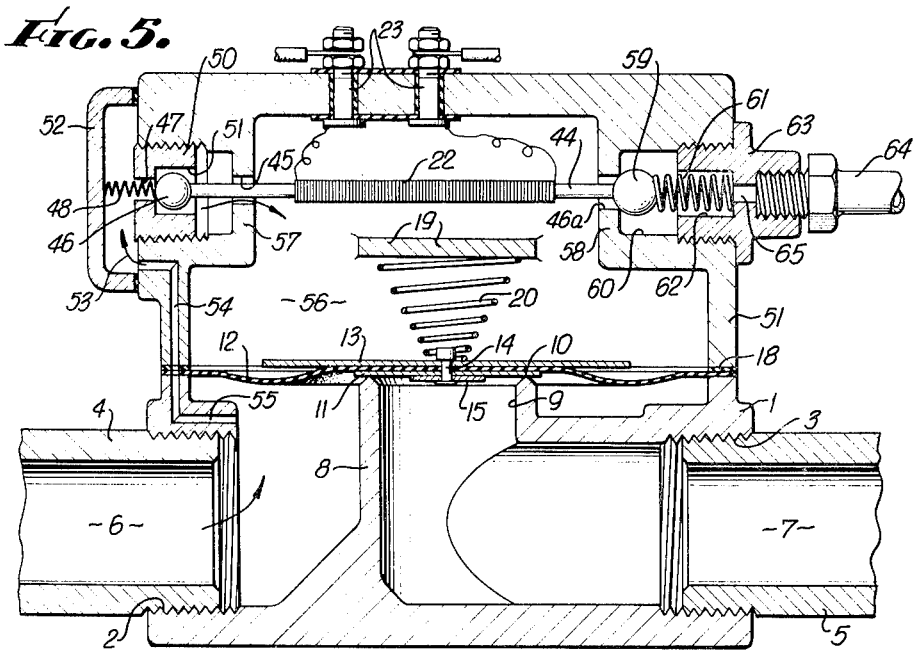
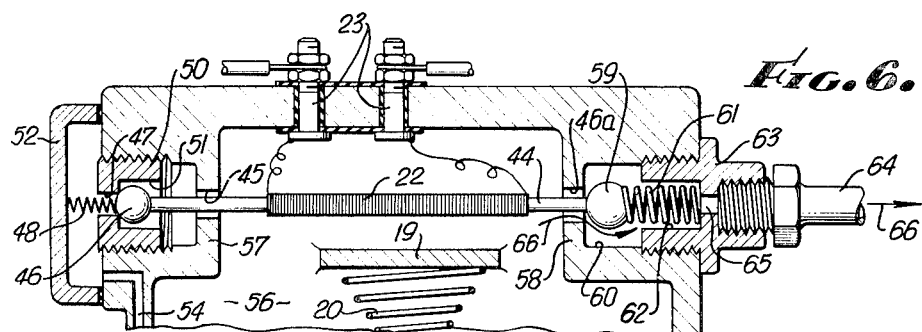

March 8, 1966    W. A. RAY    3,239,189
HEAT MOTOR OPERATED VALVES
Original Filed Oct. 19, 1961    4 Sheets-Sheet 3

INVENTOR.
WILLIAM A. RAY
BY
Flam and Flam
ATTORNEYS.

March 8, 1966 W. A. RAY 3,239,189
HEAT MOTOR OPERATED VALVES
Original Filed Oct. 19, 1961 4 Sheets-Sheet 4

INVENTOR.
WILLIAM A. RAY
BY
Flam and Flam
ATTORNEYS.

United States Patent Office 3,239,189
Patented Mar. 8, 1966

3,239,189
HEAT MOTOR OPERATED VALVES
William A. Ray, North Hollywood, Calif., assignor to International Telephone and Telegraph Corporation, New York, N.Y., a corporation of Maryland
Original application Oct. 19, 1961, Ser. No. 146,161, now Patent No. 3,151,834, dated Oct. 6, 1964. Divided and this application May 8, 1964, Ser. No. 365,959
4 Claims. (Cl. 251—11)

This application is a division of application Serial Number 146,161, filed October 19, 1961, now Patent Number 3,151,834.

This invention relates to valves, and particularly to those utilizing a heat motor for operating the valve closure.

Valves are extensively employed for the control of flow of gaseous fuel to a burner. Such a burner may for example be incorporated in house heating furnaces, or furnaces for industrial applications. Usually, the valves for controlling the flow of fuel are operated by electromagnets or solenoids. Such magnetic structures are quite expensive and bulky.

It is one of the objects of this invention to make it possible expeditiously to utilize heat that is electrically generated, to provide the movement required to operate the closure. While such valves have been suggested, the present invention provides a simple and effective means for accomplishing the valve operation.

It is another object of this invention to employ a simple form of diaphragm valve in which the inlet pressure of the gaseous fuel on one side of the diaphragm maintains the valve closed, and a heat motor operated vent valve is used to relieve the pressure on that side, so as to permit the inlet pressure on the other side to move the diaphragm to open position. With construction, the valve is rendered rugged and reliable.

It is another object of this invention to provide a temporary low-fire position of the diaphragm valve as the heat motor continues to operate.

This invention possesses many other advantages, and has other objects which may be made more clearly apparent from a consideration of several embodiments of the invention. For this purpose, there are shown a few forms in the drawings accompanying and forming part of the present specification, and which drawings, unless described as diagrammatic, or unless as otherwise indicated, are true scale. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a sectional view of a valve structure incorporating the invention, some of the details being diagrammatically represented, and the valve being shown in normally closed position;

FIG. 2 is a view similar to FIG. 1, but illustrating another position of the valve;

FIGS. 3 and 4 are enlarged detail fragmentary sectional views, illustrating two positions of an auxiliary valve utilized in the form of the invention illustrated in FIG. 1;

FIG. 5 is a view similar to FIG. 1, of a modified form of the invention, the valve being shown in normally closed position;

FIG. 6 is a fragmentary view, similar to FIG. 5, but illustrating another position of the valve structure;

Figure 7:
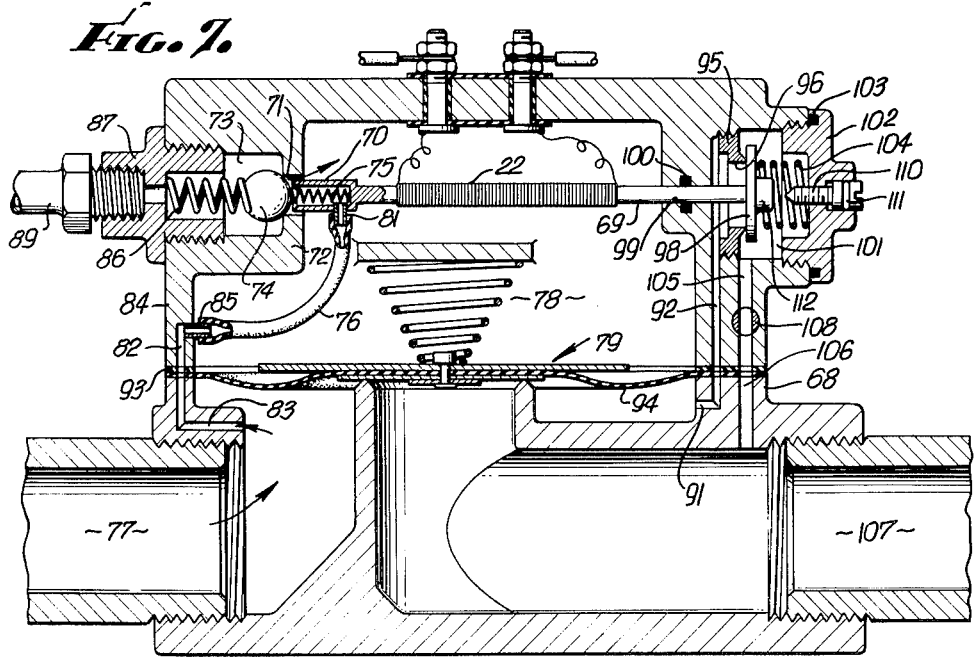
FIG. 7 is a view similar to FIG. 1 of a further modified form of the invention, the valve being shown in normally closed position.
Figure 8:
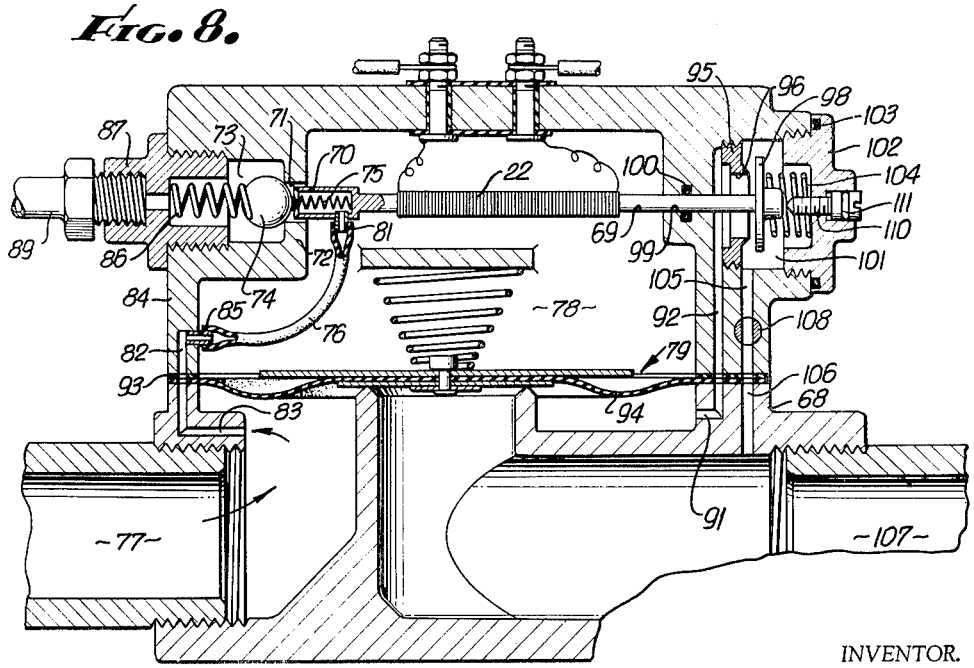
FIG. 8 is a view similar to FIG. 7, but illustrating another position of the valve structure shown in FIG. 7.

In the form of the invention illustrated in FIGS. 1 to 4, inclusive, a valve body 1 is provided. This valve body has an inlet opening 2 and an outlet opening 3. Both of these openings are threaded for accommodation of the inlet conduit 4 and the outlet conduit 5. These conduits form inlet passage 6 and outlet passage 7.

Interposed between the inlet and outlet passages 6 and 7 is a partition 8 having a vertical portion in which there is a port 9. The upper edge of the port forms a valve seat 10.

A valve closure 11 is appropriately mounted on the flexible diaphragm 12 overlying the port 9. The upper surface of this diaphragm 12 carries a disc 13 to provide a relatively firm surface against which the central portion of the diaphragm 12 may rest when it is moved upwardly to open the valve. A headed rivet 14 holds the diaphragm 12, the closure 11, the disc 13, and a washer 15 together.

A chamber 16 above the diaphragm 12 is formed by aid of the diaphragm and a housing member 17. The lower edge of the housing member 17 engages a gasket 18 interposed between the edge of body 1 and the member 17. The housing 17 also carries an abutment 19 for a relatively weak conical spring 20 that urges the diaphragm 12 downwardly.

In order to interrupt communication between passages 6 and 7, inlet pressure is exerted above the diaphragm 12 in chamber 16 so as to urge the diaphragm downwardly into the closed position illustrated in FIG. 1.

When the chamber 16 is vented, however, the inlet pressure acting on the lower surface of the diaphragm 12 is sufficient to overcome the force of the spring 20, and the valve opens to the position shown in FIG. 2.

Venting of chamber 16 and consequent opening of the valve structure is effected by the aid of a heat motor. For this purpose, expansible member 21 in the form of a rod is provided in the chamber 16. This rod may be made of any appropriate metal or alloy having a suitable coefficient of expansion. This member 21 is adapted to be electrically heated so as to expand lengthwise, by the aid of a heating unit 22 disposed around the member 21. Appropriate binding posts 23 serve as terminals for the heating unit 22.

The expansible rod 21 is slidingly supported at its left hand end within an aperture 24 is a headless screw 25. This headless screw engages a threaded aperture in the wall of housing 17 and is adjustable therein so as adjustably to position the rod 21 longitudinally. A screw 26 also engages the threaded aperture in order to cover the screw 25.

At its right hand end, rod 21 carries a hollow extension 27 (FIGS. 3 and 4) that is open at its end, forming a tapered seat for a ball closure 28. This extension 27 is appropriately guided in a port 29 formed in a wall 30. This wall 30 is formed integrally with the housing 17. The extension 27 is guided by several projections 31 formed in the wall of aperture 29.

The ball closure 28 is urged to the position of FIG. 3 with respect to port 29, by spring 32 when the rod 21 is in its unexpanded position. In this unexpanded position, gas at inlet pressure can pass through the extension 27 and past the right hand edge of the member 27 into the chamber 16 as indicated by arrow 33 in FIG. 3. Accordingly, the inlet pressure is effective to hold the diaphragm 12 in its depressed position of FIG. 1.

Gas at inlet pressure is provided by aid of a flexible conduit or hose 34 engaging a bushing or nipple 35 carried by the extension 27. The left hand end of this hose or flexible conduit similarly connects to a bushing 36 located in the wall of the housing 17 and communicates by way of ports 37 and 38 with the inlet side of the valve structure. The diaphragm 12 and the gasket 18 are both appropriately apertured to provide a continuous passageway for the gas at inlet pressure.

The right hand end of spring 32 abuts an inner wall formed in fitting 39. This fitting 39 has a hollow threaded extension 40 engaging a corresponding aperture in the wall 17. The fitting has a flange 41 and an aperture or port 42 vented to atmosphere as by a vent fitting 43 threaded into the fitting 41.

In the position shown in FIGS. 1 and 3, as heretofore stated, inlet pressure is effective to keep the valve closed. However, as heat is applied to the rod 21 by energization of the heating unit 22, the rod 21 expands and ultimately contacts the ball closure 28. When this happens, the ball closure 28 effectively prevents the flow of inlet gas to the chamber 16. Further expansion of the rod 21 lifts the ball 28 against spring 32, away from the port 29, opening the port to vent the chamber 16 by way of the fitting 43 (FIG. 4). The wall 30 is spaced from the outer wall of housing 17 to provide a chamber for the movement of the ball valve closure 28 between the two positions illustrated in FIGS. 3 and 4.

When energization of unit 22 ceases, the rod 21 contracts to the position of FIG. 1, and causes ball 28 to close port 29, and to open the hollow extension 27.

In the form shown in FIGS. 5 and 6, the valve body 1 and inlet and outlet passages 6 and 7, as well as the diaphragm 12, closure 11, and spring 20 are arranged as in the previous form. The function of this modification is similar to that of the form shown in FIG. 1, but the auxiliary valve structures are different.

Thus, the expanding rod 44 extends through clearance apertures 45 and 46a and are appropriately guided therein as by projections 31, such as are illustrated in FIG. 3. The left hand end of the rod cooperates with the ball closure 46 which in the closed position of the valve (FIG. 5) is lifted from its seat formed by a port 47 in a headless screw 50, and urged to open the position by a relatively weak spring 48. This weak spring 48 extends through the port 47. This headless screw 50 has a recess 51 for the accommodation of the ball closure 46, and is exteriorly threaded within a wall of a housing 57. A fluid tight cap 52 is attached to the left hand side of the housing 51 so as to provide an abutment for the left hand side of the spring 48. It also provides for passages indicated by arrow 53 for gas at inlet pressure from ports 54 and 55 past the port 47, the ball 46, and aperture 45 to the chamber 56.

The aperture 45 is located in a wall 57 that forms a chamber for the accommodation of the left hand end of rod 44.

At the right hand end of rod 44, a similar arrangement is provided, there being a wall 58 for the accommodation of a ball closure 59 within a recess 60. The aperture 46a extends through the wall 58, and the ball 59 is urged to closed position with respect to the aperture 46a by the aid of a relatively strong spring 61. This spring 61 at its right hand end abuts a wall of a recess 62 formed in a fitting 63. This fitting 63 is threaded into the wall of housing 51 and accommodates a vent fitting 64 in a manner similar to that illustrated in FIG. 1. A port 65 provides communication from the chamber 56 to the vent 64 when the ball 59 is lifted from its seat in FIG. 6.

In the unheated position of FIG. 5, the rod 44 is not of sufficient length to operate either one of the closures 46 or 59. When the heating unit 22 is energized, the first effect is the compression of relatively weak spring 48 by ball 46 to close off communication from the inlet passage 6 to the chamber 56, as illustrated in FIG. 6. As the rod 44 continues to expand, the ball 59 is urged to the right, opening the vent of the chamber 56, as indicated by the arrows 66 (FIG. 6).

Upon deenergizing the unit 22, the rod 44 gradually contracts; ball 59 is first seated, closing vent 64; then ball 46 is unseated, to cause gas under pressure to pass chamber 46 for closing the main valve.

In the two forms described, the expansion of the rod 21 or 44 is quite gradual so that there is a slow opening of the valve. In the form illustrated in FIGS. 7, 8, 9 and 10, a preliminary low-fire opening is provided which is effective prior to the full opening of the valve.

The valve body 68 in this form is quite similar to body 1 illustrated in the prior forms. In this instance, expandable rod 69 is provided at its left hand end with a hollow extension 70 (FIG. 10) that is guided within a port 71. This port 71 is formed in a wall 72 defining a chamber 73 for the accommodation of a ball closure 74. A weak spring 75 is provided in the hollow extension 70. As in the form illustrated in FIG. 1, the interior of extension 70 is connected by a flexible conduit 76 to the inlet passage 77 of the valve structure. In the cold position of FIGS. 7 and 10, gas at inlet pressure is passed to the chamber 78 above the diaphragm 79, as indicated by the arrows 80 of FIG. 10. The flexible conduit 76 is coupled to the interior of the extension 70 by way of coupling bushing 81; and it is coupled to the ports 82 and 83 in the housing 84 by aid of the coupling bushing 85.

The ball 74 is urged to close the port 71 by aid of a relatively strong spring 86. The left hand end of this spring abuts a wall in the fitting 87 threaded into the wall of housing 84. A port 88 (FIG. 10) leads to a vent fitting 89 threaded into the fitting 87.

Figure 9:
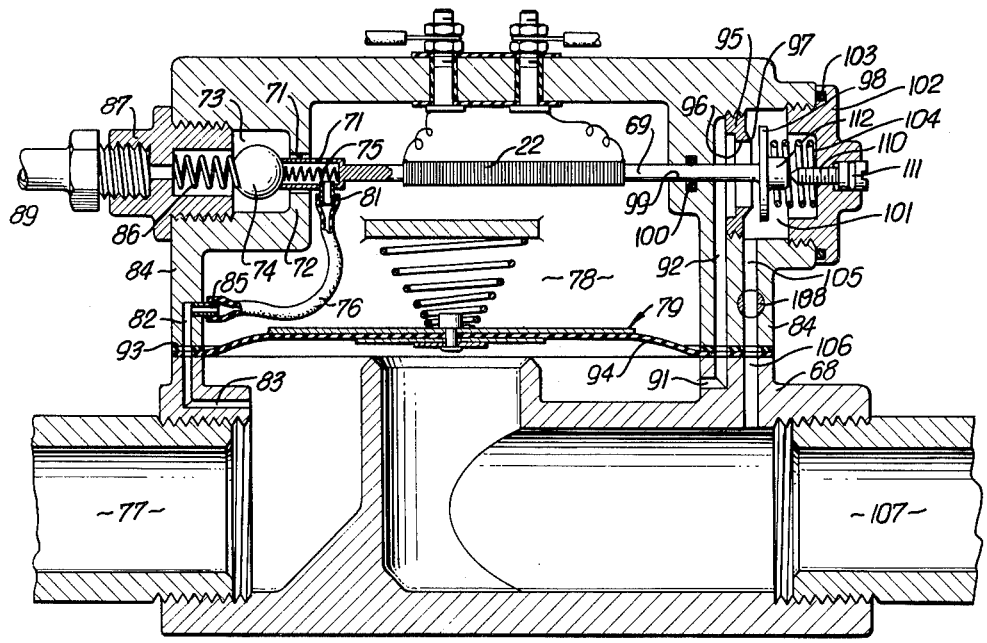
FIG. 9 is a view similar to FIG. 7, but illustrating the valve of FIG. 7 in fully opened position.

When the ball 74 is ultimately moved toward the left, away from the port 71, as illustrated in FIG. 9, the chamber 78 is vented via ports 71 and 88 and the valve closure 11 is moved upwardly away from its seat, thereby opening the main valve.

Figure 10:
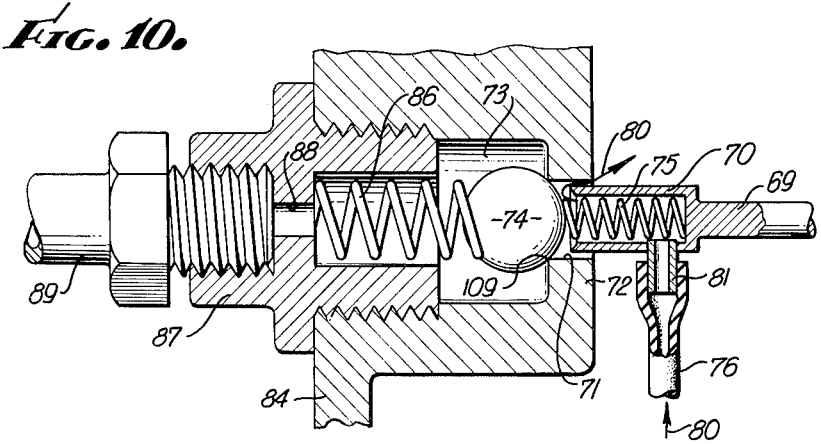
FIG. 10 is an enlarged fragmentary sectional view of an auxiliary valve structure utilized in the form of the invention illustrated in FIG. 7.

This movement of the ball 74 between the positions of FIGS. 10 and 9 is accomplished only after substantial expansion of the heated rod 69. Before this happens, a low-fire valve is arranged to be opened at least partially, to permit passage of inlet fuel through ports 91 and 92 formed respectively in the body 68 and housing 84. Appropriate apertures are formed in the gasket 93 and diaphragm 94 to permit this communication. Port 92 leads to the left hand side of an externally threaded ring 95. This ring is accommodated in a wall of the housing 84 and has a relatively large through port 96. This through port has a knife-edge seat 97 adapted to cooperate with a closure 98. This closure 98 is directly carried by the right hand end of the expansible rod 69 which is guided for movement in an aperture 99 in the wall of housing 94. An O-ring 100 surrounds the rod 69 to provide an effective seal.

The closure 98 operates in a chamber 101 formed in a wall of casing 84 and closed by a fitting 102. This fitting 102 is sealingly attached to the housing 94 as by the aid of the O-ring 103. Fitting 102 is threaded into an appropriate threaded aperture.

Located in the chamber 101 is a spring 104, urging the closure 98 to closed position. Leading from the chamber 101 are the ports 105 and 106 located respectively in the housing 84 and valve body 68, and opening in the outlet side 107 of the valve structure. A manually adjustable plug valve 108 located in the port 105 serves to adjust the volume of flow through the ports 91, 92, 96, 105 and 106, between the inlet passage 77 and the outlet passage 107.

When the rod 69 is in the unheated position of FIG. 7, it is contracted, and the valve closure 98 is seated on the ring 95. This therefore stops any low-fire fuel from being conducted from the passage 77 to the passage 107.

Shortly after the heating unit 22 is energized, the rod 69 expands toward the left, since the spring 104 is made stronger than the spring 75, but not as strong as spring 86. Accordingly, in this stage of operation, the extension 70 (FIG. 10) contacts the ball 74 and stops the flow of gas inlet pressure to the chamber 78. Additional heating of the unit 22 causes the closure 98 to assume the position of FIG. 8. The low-fire ports 91 and 92 pass gas from the inlet 77 through the port 96 and ports 105 and 106 to the outlet passage 107. This corresponds to low-fire, and if the heating is terminated at this point, the valve operates in low-fire position. In order to limit the opening movement of the valve closure 98, a stop is provided by the aid of a screw 110 which is threaded into the fitting 102 and which carries an O-ring 111 for sealing of the space 101. The inner end of the screw 110 acts as a stop against a projection 112 carried on the right hand side of the closure 108.

Additional heating of the rod 69 by increased energization will compress the strong spring 86; the ball 74 is unseated from port 109, as shown in FIG. 9, and the chamber 78 is vented through the vent 89. The valve opens, the closure 11 being lifted from its seat by the force exerted by the inlet gas pressure beneath the diaphragm 94.

Upon cooling of rod 69, the reverse operations occur; i.e., the vent for chamber 78 is closed by ball 74; then low-fire closure 98 closes port 96; and finally weak spring 75 expands to permit entry of gas under pressure into chamber 78 to close the main valve.

The inventor claims:

1. In a valve structure for controlling a gaseous medium, having a valve body with an inlet passage and an outlet passage, a partition defining a valve seat between the passages, a valve closure cooperating with the seat, a diaphragm or movable wall upon which the closure is mounted, a spring urging the diaphragm to closing position, and means cooperating with the diaphragm to define a chamber, the combination therewith of auxiliary valve structure optionally conducting gas at inlet pressure to the chamber, or venting the chamber, comprising an elongated member capable of heat expansion; an electric heating element in heat conduction relation to said member; a first port communicating with the inlet passage and with the chamber; a first auxiliary closure controlling said first port and in normally open position when the member is unheated; first resilient means urging said first auxiliary closure toward open position and into abutting relation with one end of said member; a vent port communicating with the chamber; a second auxiliary closure controlling said vent port and in normally closed position when the member is unheated said second closure located adjacent the other end of said elongated member; and second resilient means urging said second auxiliary closure toward closed positions; and into abutting relation with the other end of said member the expansion of said member by heat conduction from said electric heating element moving said first and second auxiliary closures in opposition to their respective first and second resilient means to close said first port and said vent port.

2. In a valve structure for controlling a gaseous medium, having a valve body with an inlet passage and an outlet passage, a partition defining a valve seat between the passages, a valve closure cooperating with the seat, a diaphragm or movable wall upon which the closure is mounted, a spring urging the diaphragm to closing position, and means cooperating with the diaphragm to define a chamber, the combination therewith of auxiliary valve structure optionally conducting gas at inlet pressure to the chamber, or venting the chamber, comprising an elongated member capable of heat expansion; an electric heating element in heat conducting relation to said member; a first port communicating with the inlet passage and with the chamber; a first auxiliary closure controlling said first port and in normally open position when the member is unheated; first resilient means urging said first auxiliary closure toward open position; and into abutting relation with one end of said member a vent port communicating with the chamber; a second auxiliary closure controlling said vent port and in normally closed position when the member is unheated said second closure located adjacent the other end of said elongated member; and second resilient means urging said second auxiliary closure toward closed position; said second auxiliary closure being movable in opposition to said second resilient means by the opposite end of said member and into abutting relation with the other end of said member; the expansion of said member by heat conduction from said electric heating element moving said first and second auxiliary closures in opposition to their respective first and second resilient means to close said first port and open said vent port in sequence.

3. The combination as set forth in claim 1, with the provision of means for adjusting the distance through which the first auxiliary closure must move to close the first port.

4. The combination as set forth in claim 2, with the provision of means for adjusting the distance through which the first auxiliary closure must move to close the first port.

References Cited by the Examiner

UNITED STATES PATENTS

| | | | |
|---|---|---|---|
| 2,200,187 | 5/1940 | Nelson | 236—68 |
| 2,461,615 | 2/1949 | Taylor | 251—11 X |
| 3,024,811 | 3/1962 | McKinley | 251—11 X |

M. CARY NELSON, *Primary Examiner.*